(12) United States Patent
Gu et al.

(10) Patent No.: US 10,437,395 B2
(45) Date of Patent: Oct. 8, 2019

(54) TOUCH SENSING ELEMENT AND TOUCH DISPLAY DEVICE

(71) Applicants:Boe Technology Group Co., Ltd., Beijing (CN); Hefei Boe Optoelectronics Technology Co., Ltd., Anhui (CN)

(72) Inventors: Honggang Gu, Beijing (CN); Xianjie Shao, Beijing (CN); Jie Song, Beijing (CN); Chengna Liu, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 99 days.

(21) Appl. No.: 15/329,347

(22) PCT Filed: Jul. 6, 2016

(86) PCT No.: PCT/CN2016/088806
§ 371 (c)(1),
(2) Date: Jan. 26, 2017

(87) PCT Pub. No.: WO2017/113702
PCT Pub. Date: Jul. 6, 2017

(65) Prior Publication Data
US 2018/0210574 A1    Jul. 26, 2018

(30) Foreign Application Priority Data
Dec. 31, 2015 (CN) .......................... 2015 1 1014073

(51) Int. Cl.
*G06F 3/044* (2006.01)
*G06F 3/047* (2006.01)
*G06F 3/041* (2006.01)

(52) U.S. Cl.
CPC .............. *G06F 3/044* (2013.01); *G06F 3/047* (2013.01); *G06F 3/0412* (2013.01)

(58) Field of Classification Search
None
See application file for complete search history.

(56) References Cited

U.S. PATENT DOCUMENTS

| 8,373,667 | B2 | 2/2013 | Selker |
| 2011/0102363 | A1 | 5/2011 | Yang et al. |

(Continued)

FOREIGN PATENT DOCUMENTS

| CN | 201765580 | 3/2011 |
| CN | 102681734 | 9/2012 |

(Continued)

OTHER PUBLICATIONS

International Search Report for PCT/CN2016/088806 dated Sep. 30, 2016.

(Continued)

*Primary Examiner* — Kenneth B Lee, Jr.
(74) *Attorney, Agent, or Firm* — Calfee, Halter & Griswold LLP (57) ABSTRACT

Embodiments of the present disclosure provide a touch sensing element comprising a plurality of touch sensing units and a touch display device. The touch sensing unit comprises a plurality of first touch sensing subunits at least capable of receiving a driving signal and comprising an electrode block array. In the electrode block array of the first touch sensing subunit, any two adjacent electrode blocks in the row direction or in the column direction are connected to each other. The touch sensing element can be applied in a display device for realizing touch control, which increases (Continued)

the aperture ratio of pixels of the display device and facilitates improvement of the image quality and the visual effect of the display device.

20 Claims, 5 Drawing Sheets

(56) References Cited

U.S. PATENT DOCUMENTS

| | | | |
|---|---|---|---|
| 2011/0298746 | A1 | 12/2011 | Hotelling |
| 2016/0147343 | A1* | 5/2016 | Zhou .................... G06F 3/0412 345/173 |
| 2017/0300155 | A1* | 10/2017 | Gu .......................... G06F 3/044 |

FOREIGN PATENT DOCUMENTS

| | | |
|---|---|---|
| CN | 202995200 | 6/2013 |
| CN | 104375706 | 2/2015 |
| CN | 105045453 | 11/2015 |
| CN | 105183252 | 12/2015 |
| CN | 204926042 | 12/2015 |
| CN | 105446535 | 3/2016 |
| CN | 205451007 | 8/2016 |

OTHER PUBLICATIONS

Office Action from China Application No. 201511014073.7 dated Aug. 5, 2016.
Office Action from China Application No. 201511014073.7 dated Dec. 21, 2016.
Fourth Office Action from China Application No. 201511014073.7 dated May 27, 2017.
Third Office Action from China Application No. 201511014073.7 dated Apr. 7, 2017.
Search Report for Chinese Application No. 201511014073.7 dated May 16, 2017.
Search Report for European Patent Application No. 16826694.8 dated Jul. 12, 2019.

* cited by examiner

TOUCH SENSING ELEMENT AND TOUCH DISPLAY DEVICE

RELATED APPLICATIONS

The present application is the U.S. national phase entry of PCT/CN2016/088806, with an international filing date of Jul. 6, 2016, which claims the benefit of Chinese Patent Application No. 201511014073.7, filed on Dec. 31, 2015, the entire disclosure of which is incorporated herein by reference.

FIELD OF THE INVENTION

The present disclosure relates to the field of display technologies, and more particularly to a touch sensing element and a touch display device.

BACKGROUND

At present, many types of input devices are applicable in a computer system for performing operations, for example, mouse, button, touch screen, joystick, and the like. Due to the ease of use, the versatility in operation, the ever-decreasing price and the steadily improving yield, the touch screen is becoming more and more popular. As the touch screen gradually comes into people's lives, the past input devices are gradually eliminated from people's vision. Touch screens may be classified into an out-cell type and an embedded type. For an out-cell type touch screen, a panel having touch control function is arranged in front of the display device, and the touch surface covers the visual area of the display area. An embedded type touch screen is to integrate the touch control function into the panel of the display device, to the outside of which protective glass may be attached or not. The user can carry out the touch control operation by touching the screen with a finger. The embedded type touch screen may be further classified into two types: in cell and on cell. An on-cell type touch screen makes a touch sensing element (touch electrode) on the outside of the display screen, to which other elements such as a polarizer and protective glass are attached. For an in-cell type touch screen, the touch sensing element is typically fabricated on the glass substrate side of the array substrate, and then a complete display panel is made to achieve the touch control function.

A conventional touch sensing element is designed as comprising a plurality of touch electrodes in the horizontal direction and a plurality of touch electrodes in the vertical direction to form electrode patterns that intersect each other. However, for an in-cell type touch screen, if it is designed in this manner, the touch control is inevitably disturbed by the data lines or gate lines in pixels of the display panel, which may thereby result in a false touch point.

Figure 1:
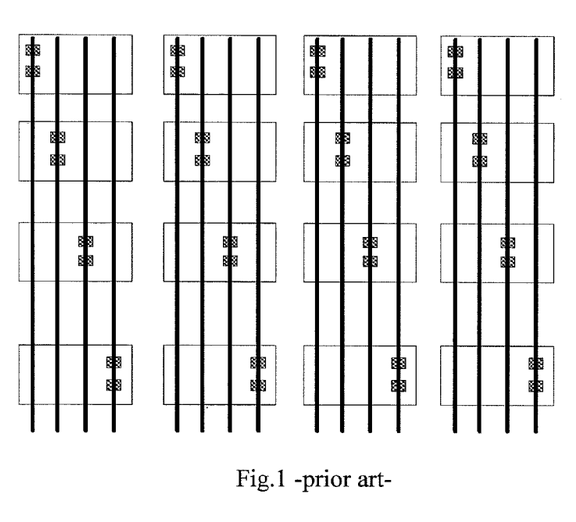
FIG. 1 illustrates a pattern for a touch sensing element in the prior art.

Another conventional touch sensing element is designed as multiplexing a common electrode as a touch sensing element by time-division multiplexing. FIG. 1 illustrates a pattern of a common electrode in the prior art which is multiplexed as a touch sensing element. As shown in FIG. 1, the common electrode is divided into a plurality of electrode blocks which are discontinuous in both the horizontal direction and the vertical direction. A plurality of touch signal lines and each electrode block of the common electrode are arranged in different layers at a position corresponding to each electrode block, and the touch signal lines can be electrically connected to corresponding electrode blocks through via holes. The touch signal line is further connected to a touch detection chip (not shown in FIG. 1) to provide a touch signal (driving signal) to respective electrode blocks. These touch signal lines are usually formed of a metal material, and therefore these touch signal lines can be referred to herein as touch pattern metals (TPM). However, a disadvantage of setting these touch signal lines is that they may affect the aperture ratio of pixels of the display device, thereby affecting the image quality and the visual effect for the final display product. Furthermore, the formation of touch pattern metals (TPM) brings about additional materials and processes to the display device during the actual manufacturing process, resulting in an increase in the cost of the display device.

SUMMARY

An objective of the present disclosure is to provide a touch sensing element and a display device comprising such touch sensing element, so as to alleviate or avoid at least some of the problems mentioned above.

An embodiment of the present disclosure provides a touch sensing element, comprising a plurality of touch sensing units disposed in a same layer, each of the touch sensing units comprising at least one first touch sensing subunit, each first touch sensing subunit comprising a first electrode block array composed of multiple cascaded electrode blocks disposed in a same layer.

Further, a plurality of first touch sensing subunits may be insulated from each other.

Further, an electrode block array in each first touch sensing subunit may comprise at least two rows of electrode blocks disposed in a same layer that are arranged in a row direction.

Further, the electrode block array in each first touch sensing subunit may comprise at least two columns of electrode blocks disposed in a same layer that are arranged in a column direction.

Further, any two adjacent electrode blocks in the electrode block array in the row direction and the column direction may be connected to each other.

Further, the touch sensing element may comprise a first wiring electrically connected to the first electrode block array and disposed in the same layer as the first electrode block array.

Further, in another embodiment, each of the touch sensing units further may comprise a second touch sensing subunit, the second touch sensing subunit comprising a second electrode block array composed of multiple cascaded electrode blocks.

Further, a plurality of second touch sensing subunits may be insulated from each other, and each second touch sensing subunit may be insulated from the first touch sensing subunit.

Further, the touch sensing element may further comprise a second wiring electrically connected to the second electrode block array and disposed in a same layer as the second electrode block array.

Further, in some embodiments, in the touch sensing unit, any two of the electrode blocks which are electrically connected are connected to each other via a connection structure formed of a same material as the electrode blocks, and are formed by a same process.

Further, the electrode block and the connection structure may be both made of a transparent conductive material.

The present disclosure further provides a touch display device comprising the touch sensing element described in any of the above embodiments.

Further, the touch display device comprises an array substrate, the array substrate comprising subpixel units arranged in an array, the electrode blocks are in one-to-one correspondence with the subpixel units and act as a common electrode when an image is displayed to achieve image displaying with a pixel electrode.

Further, in some embodiments, the touch sensing element receives a common electrode signal to achieve image displaying within one-frame scanning time, and the touch sensing unit in the touch sensing element receives a driving signal to achieve touch control after the one-frame scanning time ends and before a next frame begins.

Further, data lines of the array substrate may be disposed at positions of gaps between the electrode blocks.

The touch sensing elements provided by the embodiments of the present disclosure may be applied in a display device for realizing touch control. As compared to the prior art, due to the omission of touch pattern metal (TPM), the aperture ratio of pixels of the display device may be increased and the image quality and the visual effect of the display device may be improved, meanwhile, the manufacturing process for the touch pattern metal (TPM) can be avoided, thereby reducing the cost of the touch panel or the display device.

BRIEF DESCRIPTION OF THE DRAWINGS

Embodiments of the invention will be described in more detail by way of non-limiting example with reference to the drawings, in which.

DETAILED DESCRIPTION OF EMBODIMENTS

Specific embodiments of the present disclosure will be described below in detail by way of example. It should be understood that embodiments of the present disclosure are not limited to the examples enumerated below. Those skilled in the art can make modifications and variations to the illustrated embodiments using the principle or spirit of the present disclosure to obtain other embodiments in different forms. Apparently, these embodiments all fall within the protection scope of the invention.

Figure 2:
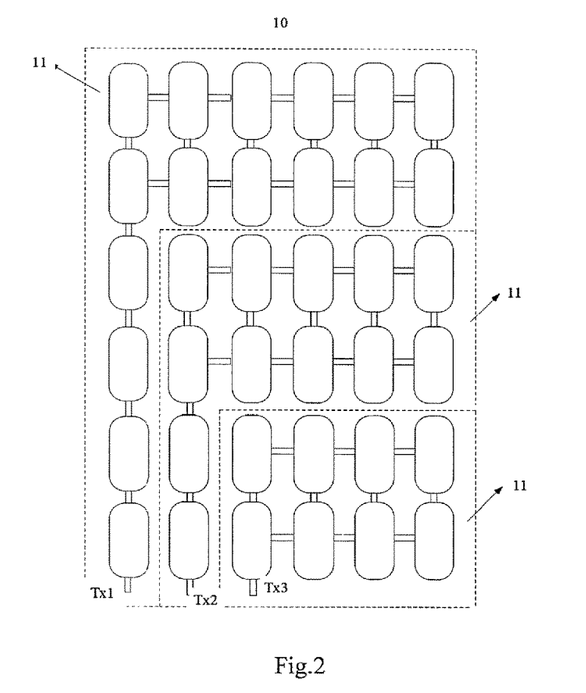
FIG. 2 illustrates a pattern for a touch sensing unit in a touch sensing element according to an embodiment of the present disclosure.

FIG. 2 schematically shows a pattern of a touch sensing unit 10 for a touch sensing element according to an embodiment of the present disclosure. It is to be understood that the touch sensing element provided in this embodiment may comprise a plurality of touch sensing units 10 disposed in a same layer. In other words, the touch sensing unit 10 shown in FIG. 2 is just a repeating unit in the touch sensing element. In this embodiment, the touch sensing element may comprise a plurality of touch sensing units 10 disposed in the same layer. The touch sensing unit 10 comprises at least one first touch sensing subunit 11, each first touch sensing subunit 11 comprising a first electrode block array. The first electrode block array of the first touch sensing subunit 11 is composed of a plurality of cascaded electrode blocks disposed in the same layer.

For clarity and simplification, FIG. 2 only illustrates three first touch sensing subunits 11. It is to be understood that a single touch sensing unit 10 may comprise at least one first touch sensing subunit 11 and the plurality of first touch sensing subunits 11 are insulated from each other. As shown in FIG. 2, the plurality of first touch sensing subunits 11 in the touch sensing unit 10 may have similar structures or patterns, but the number of electrode blocks included in each of the first touch sensing subunits 11 may be different. Since the electrode blocks are cascaded to each other in the first electrode block array for each first touch sensing subunit, the first electrode block array in each of the first touch sensing subunits 11 may form a substantially uninterrupted pattern.

Further, the touch sensing element may further comprise a first wiring electrically connected to the first electrode block array and disposed in the same layer as the first electrode block array, for connecting a driving chip. The first wiring may be composed of multiple electrode blocks that are electrically connected. For example, the three first touch sensing subunits 11 may be respectively connected to the driving chip via the first wiring made up of multiple electrode blocks connected in series.

In this embodiment, the touch sensing element comprising a plurality of touch sensing units 10 can be used as a self-capacitance mode touch electrode. As known to those skilled in the art, the self-capacitance sensing detection method detects the touch position by detecting a change in the capacitance of the touch electrode itself (a change in the capacitance of the touch electrode itself occurs when a finger touches the touch screen). As shown in FIG. 2, the first electrode block arrays for the three first touch sensing subunits 11 may receive, as touch electrodes respectively, driving signals Tx1, Tx2 and Tx3 that are sequentially provided via the first wiring. The first electrode block arrays for the three first touch sensing subunits 11 may also provide a feedback signal to the touch detection chip successively in response to the received driving signals, respectively, and the touch detection chip determines whether touch takes place or not by analyzing the feedback signal, thereby achieving the self-capacitance touch control detection function. Alternatively, the three first electrode block arrays of the three first touch sensing subunits 11 may also receive, as touch electrodes, three identical driving signals Tx1, Tx2, and Tx3, and the first electrode block arrays of the three first touch sensing subunits 11 may be combined into an entirety to receive driving signals and provide feedback signals. Those skilled in the art can thus derive how multiple first touch sensing subunits of any number are combined and how to drive them depending on the precision requirement for touch control. Accordingly, this embodiment can provide a structural basis for realizing the self-capacitance mode touch control.

Figure 4:
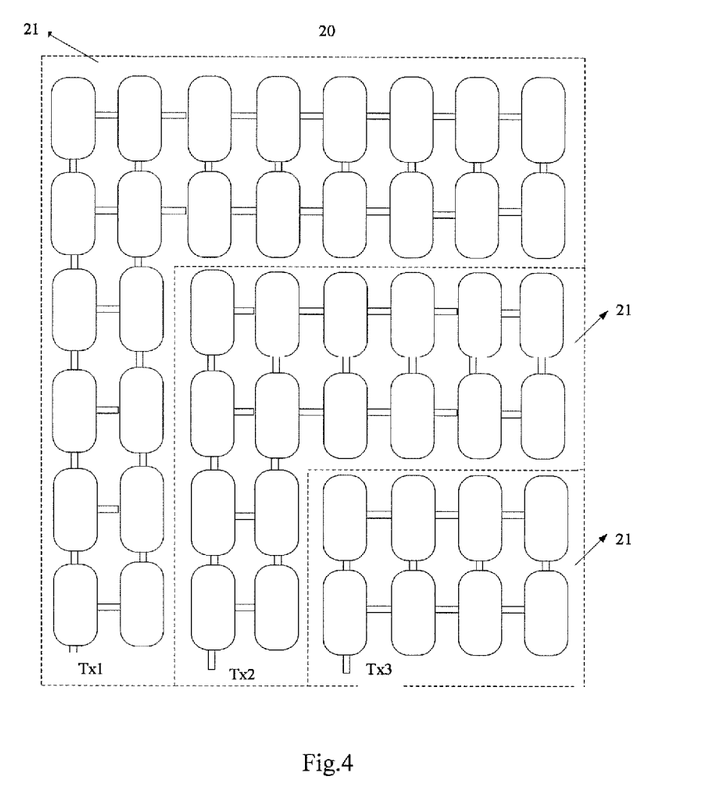
FIG. 4 illustrates a pattern for a touch sensing unit with further variations based on the touch sensing unit shown in FIG. 2.

Similarly, another example implementation of the structures of one touch sensing unit 20 for the touch sensing element and the first touch sensing subunit 21 included in the touch sensing unit 20 as shows in FIG. 4 can also provide a structural basis for realizing the self-capacitance mode touch control, and is not described here for simplicity.

It is to be noted that, in case the first wiring is composed of electrode blocks electrically connected, the change in capacitance of the first wiring may also contribute to the sensing of touch control in the actual touch sensing. However, since the first wiring functions only as connecting the driving chip, a change in the capacitance generated on the first wiring upon each touch is much smaller than the change in the capacitance generated on the first electrode block array, those skilled in the art may ignore or identify the change in the capacitance generated on the first wiring by means of conventional technical measures, so that positioning for touch is not affected.

Figure 5:
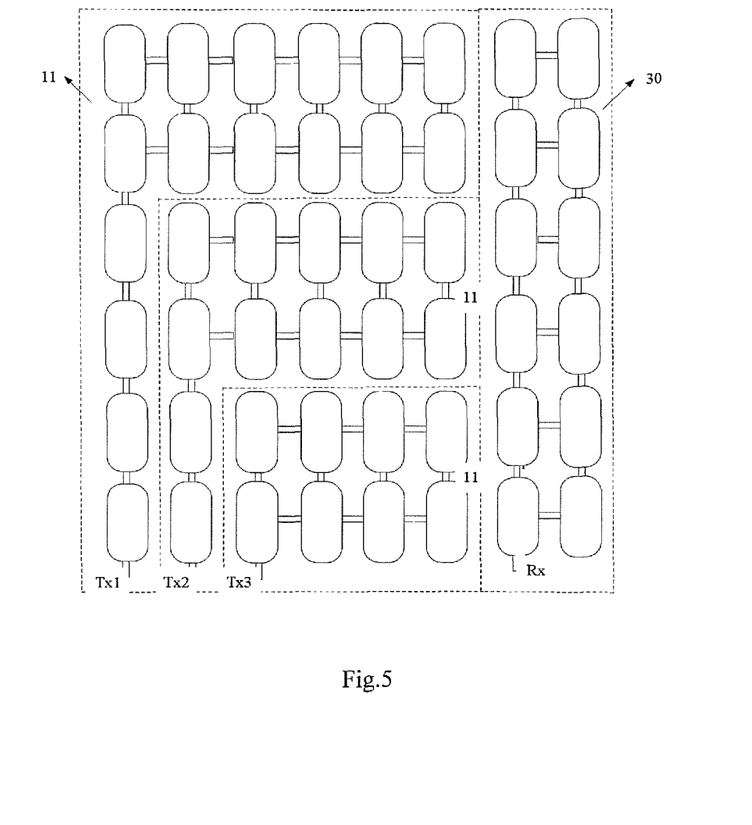
FIG. 5 illustrates a pattern for a touch sensing unit in a touch sensing element according to a further embodiment of the present disclosure.

Referring to FIG. 5, it schematically shows a touch sensing element according to another embodiment of the present disclosure, in which a second touch sensing subunit 30 is added on the basis of the embodiment as shown in FIG. 2. The second touch sensing subunit comprises a second electrode block array composed of a plurality of cascaded electrode blocks disposed in the same layer, and the second touch sensing subunit is insulated from the first touch sensing subunit.

In addition to having the same or similar structure as that in FIG. 2, the structure of this embodiment in which the second touch sensing subunit 30 is added can provide a structural basis for realizing mutual capacitance touch control. Each of the first touch sensing subunits 11 can be used as a driving electrode for receiving driving signals Tx1, Tx2, Tx3 from the touch detection chip, the second touch sensing subunit 30 can be used as a sensing electrode for providing a sensing signal Rx to the touch detection chip. As is known to those skilled in the art, when a finger touches the screen, the capacitance between the driving electrode and the sensing electrode would change, and the touch position can be determined by means of the change in the capacitance between the driving electrode and the sensing electrode.

In the mutual capacitance sensing detection mode, respective driving electrodes in different touch sensing units can receive the same driving signal simultaneously. For example, for the embodiment shown in FIG. 5, respective electrode block arrays that serve as driving electrodes in different touch sensing units can receive the same driving signal simultaneously. In this way, the number of pins for the touch panel can be reduced.

Figure 6:
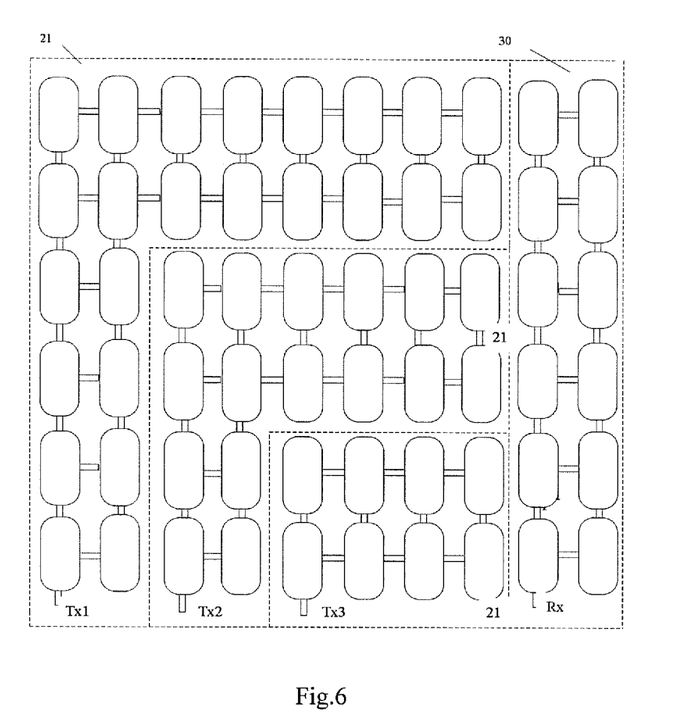
FIG. 6 illustrates a pattern of a touch sensing unit with further variations based on the touch sensing unit shown in FIG. 5.

FIG. 6 illustrates another example implementation according to the embodiment of the present disclosure. Likewise, in this embodiment, in addition to three first touch sensing subunits 21 capable of receiving driving signals, each touch sensing unit further comprises at least one second touch sensing subunit 30 capable of generating a sensing signal in response to the driving signal. The differences lie in that the number of electrode blocks included in the first electrode block arrays for the three first touch sensing subunits 21 in FIG. 6 is different from that shown in FIG. 5, and the number of electrode blocks included in the second electrode block array for the second touch sensing subunit 30 in FIG. 6 is different from that shown in FIG. 5.

Further, as compared to the foregoing embodiments, the touch sensing element in this embodiment may further comprise a second wiring which is electrically connected to the second electrode block array and disposed in the same layer as the second electrode block array, for connecting the touch detection chip. The second wiring may be composed of a plurality of electrode blocks electrically connected.

On the basis of foregoing embodiments, in the touch sensing unit, any two electrically connected electrode blocks are connected to each other by a connection structure formed of the same material as the electrode block and are formed by the same process. For example, the electrode block and the connection structure are both made of a transparent conductive material, such as including but not limited to indium tin oxide (ITO) material.

The first touch sensing subunit or the second touch sensing subunit of each touch sensing unit in the embodiments described above may comprise tens or even hundreds of rows of electrode blocks in the row direction, and may also comprise tens or even hundreds of columns of electrode blocks in the column direction.

The touch sensing unit that consists of a plurality of first touch sensing subunits or a plurality of first touch sensing subunits and second touch sensing subunits may take on a certain shape as a whole so that the entirety of the pattern of the touch sensing element may assume a certain specific shape. For example, all of the electrode block arrays included in the plurality of first touch sensing subunits and second touch sensing subunits may present a regular square shape as a whole. Thus, such a touch sensing element can be well applied to a touch display device which typically has a square-shaped active display area, and can realize mutual capacitance mode touch control. However, possible patterns of the touch sensing unit are not limited to the patterns shown in FIGS. 2, 4, 5 and 6, and the first touch sensing subunit or the second touch sensing subunit is not limited to the patterns shown in FIGS. 2, 4, 5 and 6, either, instead, they may have any other appropriate arrangement.

The present disclosure further provides a touch display device comprising the touch sensing element as described in any of the above embodiments. When the touch sensing element is applied to a display device, it is formed as a single layer structure and can provide a structural basis for realizing normal displaying and touch control simultaneously.

Specifically, the touch display device may comprise an array substrate, the array substrate comprising subpixel units arranged in an array. The electrode blocks may be in one-to-one correspondence with the subpixel units and may act as a common electrode to achieve image displaying with a pixel electrode. When the touch sensing element provided by the embodiment of the present disclosure is applied to the touch display device to achieve the touch control function, since the touch sensing element is formed as a single layer structure, the touch sensing element may also be used as the common electrode in the display device by way of a suitable control method, e.g. a common electrode in the array substrate or the color film substrate for a liquid crystal display (LCD) device.

Figure 3:
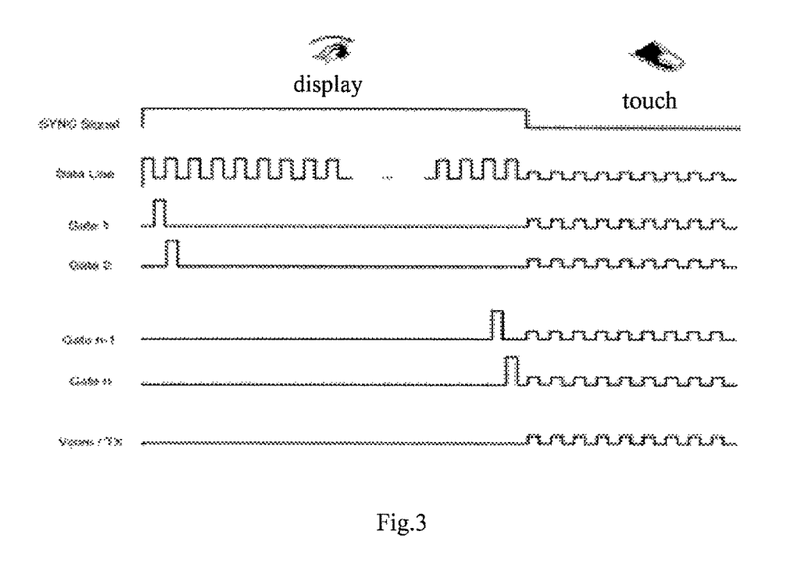
FIG. 3 schematically shows a variation in a signal received by touch sensing element when it is multiplexed as a common electrode according to an embodiment of the present disclosure.

For example, during one-frame scanning time, respective touch sensing units in the touch sensing element may receive a common electrode signal Vcom to achieve image displaying. At that time, the touch sensing element operates as a common electrode. After the one-frame scanning time ends and before the next frame scanning begins, the touch sensing element may receive a driving signal from the touch detection chip to achieve touch control. FIG. 3 illustrates signals received by the touch sensing element during the display phase and the touch control phase, respectively. As shown in FIG. 3, the touch sensing element receives a normal common electrode signal Vcom within one-frame scanning time. Such common electrode signal Vcom is generally constant to maintain a substantially constant potential of the touch sensing element, i.e. at that time the touch sensing element operates as a common electrode. After the one-frame scanning time ends and before the next frame scanning begins, the touch sensing element receives a driving signal from the touch detection chip so as to detect the touch position.

As compared to the prior art, the touch display device constructed in this way increases the aperture ratio of pixels of the touch display device and facilitates improvement of the image quality and the visual effect of the display device due to the omission of touch pattern metal (TPM), while avoiding the manufacturing process for the touch pattern metal and thereby reducing the cost of the touch panel or the display device.

Further, data lines of the array substrate may be disposed at the positions of gaps between the electrode blocks so that the driving electrodes or the sensing electrodes including the electrode block arrays can shun the positions of the data lines of pixels. This can effectively reduce the interference caused by the data lines and improve the accuracy of touch control.

Embodiments of the present disclosure have been described above in detail by way of example. It is to be noted that the above embodiments are for illustrative purposes instead of limiting the invention. Moreover, those skilled in the art would be able to design many alternative embodiments without departing from the scope of the claims enclosed. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A touch sensing element, comprising: a plurality of touch sensing units disposed in a same layer, wherein each of the touch sensing units comprises at least one first touch sensing subunit and wherein the at least one first touch sensing subunit comprises a first electrode block array composed of multiple cascaded electrode blocks disposed in a same layer.

2. The touch sensing element according to claim 1, wherein a plurality of first touch sensing subunits are insulated from each other.

3. The touch sensing element according to claim 2, wherein an electrode block array in each first touch sensing subunit comprises at least two rows of electrode blocks disposed in a same layer that are arranged in a row direction.

4. The touch sensing element according to claim 3, wherein the electrode block array in each first touch sensing subunit comprises at least two columns of electrode blocks disposed in a same layer that are arranged in a column direction.

5. The touch sensing element according to claim 4, wherein any two adjacent electrode blocks in the electrode block array in the row direction and the column direction are connected to each other.

6. The touch sensing element according to claim 5, wherein the touch sensing element comprises a first wiring electrically connected to the first electrode block array and disposed in the same layer as the first electrode block array.

7. The touch sensing element according to claim 1, wherein each of the touch sensing units further comprises a second touch sensing subunit, the second touch sensing subunit comprising a second electrode block array composed of multiple cascaded electrode blocks.

8. The touch sensing element according to claim 7, wherein the plurality of touch sensing subunits are insulated from each other, each second touch sensing subunit is insulated from the first touch sensing subunit.

9. The touch sensing element according to claim 8, wherein the touch sensing element further comprises a second wiring electrically connected to the second electrode block array and disposed in a same layer as the second electrode block array.

10. The touch sensing element according to claim 1, wherein in the touch sensing unit, any two of the electrode blocks which are electrically connected are connected to each other via a connection structure formed of a same material as the electrode blocks, and are formed by a same process.

11. The touch sensing element according to claim 10, wherein the electrode block and the connection structure are both made of a transparent conductive material.

12. A touch display device comprising a touch sensing element, the touch sensing element comprising: a plurality of touch sensing units disposed in a same layer, wherein each of the touch sensing units comprises at least one first touch sensing subunit and wherein the at least one first touch sensing subunit comprises a first electrode block array composed of multiple cascaded electrode blocks disposed in a same layer.

13. The touch display device according to claim 12, wherein the touch display device comprises an array substrate, the array substrate comprising subpixel units arranged in an array, the electrode blocks are in one-to-one correspondence with the subpixel units and act as a common electrode when an image is displayed to achieve image displaying with a pixel electrode.

14. The touch display device according to claim 13, wherein the touch sensing element receives a common electrode signal to achieve image displaying within one-frame scanning time, and the touch sensing unit in the touch sensing element receives a driving signal to achieve touch control after the one-frame scanning time ends and before a next frame begins.

15. The touch display device according to claim 14, wherein data lines in the array substrate are disposed at positions of gaps between the electrode blocks.

16. The touch display device according to claim 12, wherein a plurality of first touch sensing subunits are insulated from each other.

17. The touch display device according to claim 16, wherein an electrode block array in each first touch sensing subunit comprises at least two rows of electrode blocks disposed in a same layer that are arranged in a row direction.

18. The touch display device according to claim 17, wherein the electrode block array in each first touch sensing subunit comprises at least two columns of electrode blocks disposed in a same layer that are arranged in a column direction.

19. The touch display device according to claim 18, wherein any two adjacent electrode blocks in the electrode block array in the row direction and the column direction are connected to each other.

20. The touch display device according to claim 19, wherein the touch sensing element comprises a first wiring electrically connected to the first electrode block array and disposed in the same layer as the first electrode block array.

* * * * *